E. M. BIRDSALL.
Piston for Steam-Engines.
No. 225,555. Patented Mar. 16, 1880.
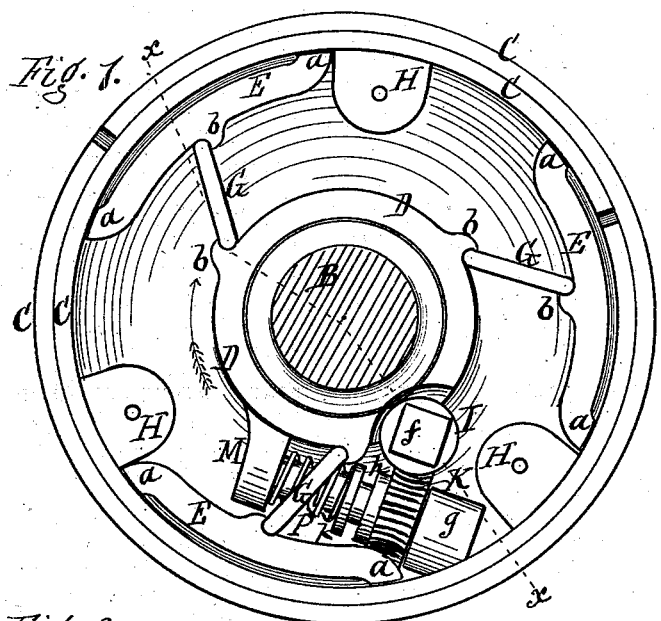
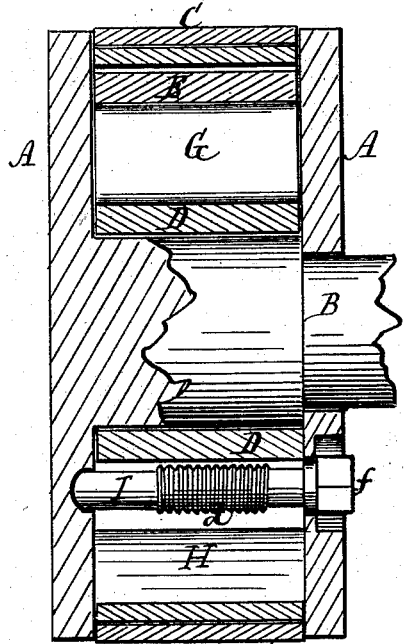
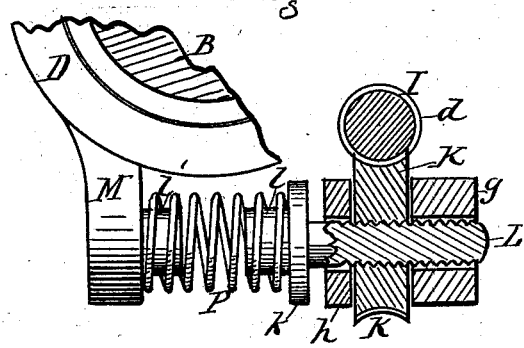
Attest.
Chas. H. Truman
R. E. White
Inventor.
Edgar M. Birdsall.
pr R. E. Osgood.
Atty.

UNITED STATES PATENT OFFICE.

EDGAR M. BIRDSALL, OF PENN YAN, NEW YORK.

PISTON FOR STEAM-ENGINES.

SPECIFICATION forming part of Letters Patent No. 225,555, dated March 16, 1880.

Application filed June 21, 1879.

*To all whom it may concern:*

Be it known that I, EDGAR M. BIRDSALL, of Penn Yan, Yates county, New York, have invented a certain new and useful Improvement in Pistons for Steam-Engines; and I do hereby declare that the following is a full, clear, and exact description of the same, reference being had to the accompanying drawings, in which—

Figure 1 is a plan of the piston with one head removed to show the interior arrangement. Fig. 2 is a section in line $x$ $x$. Fig. 3 is a plan, partially in section, of the screw device for expanding the packings.

My improvement relates to devices for expanding the packing-rings in engine-pistons; and it consists in the construction and arrangement of parts hereinafter more fully described.

A A represent the heads of the piston, and B the piston-rod. C C are the divided metallic packing-rings, forming the periphery of the piston, and are of the usual form and construction.

I employ the following means for expanding the rings: D is a cylindrical ring resting loosely around the hub of the rod within the piston. E E E are a series of followers, of curved form, having feet $a$ $a$, which rest and bear against the inner periphery of the packing-rings. G G G are a series of stiff connecting links or arms which stand angularly between the ring D and the followers E E E. They rest loosely against said parts, but are retained in position by reverse lugs $b$ $b$, as shown in Fig. 1, said lugs forming sockets to the links and allowing a joint or hinge action as the parts are operated. A greater or less number of the followers and links may be employed, as desired, but three are generally used. H H H are abutments or posts for the attachment of the loose head of the piston, and conveniently serving as stops for the ends of the followers to rest against, as shown. I is a worm, consisting of a bolt set vertically into the piston so as to turn easily, and having a thread, $d$, and a wrench-head, $f$, the latter resting outside, so that it may be turned without opening the piston. K is a worm-wheel resting between fixed bearings $g$ $h$, but turning freely. It is cut with a female thread. L is a screw which runs loosely through the bearings $g$ $h$, but engages with the thread in the wheel K, the latter forming a nut. The worm I, when it is turned, gives motion to the wheel K, and the latter gives motion to the screw out or in. The screw has a fixed head or collar, $k$, which forms a shoulder, and a projecting stem, $l$, for the connection of the spring. M is a stiff arm attached to the loosely-turning ring D, and $l'$ is a stud projecting therefrom in line with stud $l$ of the screw, and serving for the attachment of the other end of the spring connecting said parts. P is the spring, preferably made of coiled wire, as shown.

To expand the packing-rings of the piston a wrench is applied to the head of the worm I, which rests outside the piston, and the same is turned, which gives motion to wheel K and forces out the screw L. This compresses spring P against arm M and causes the ring D to turn on the hub of the piston-rod. The turning of the ring has a tendency to straighten the links G G, which, consequently, force the followers E E E out against the packings. The packings are released by simply turning back the worm.

The expansion and contraction are so gradual by the turning of the worm that very accurate adjustment may be made, even by an unskilled workman.

All parts of the packings are equally expanded by reason of the several bearings around the circle, each having the same and equal motion.

The arrangement above described is in simple, convenient, and compact form, and presents the advantage of being operated from the outside, and avoids the necessity of opening the piston to expand the packings. The spring P allows a certain degree of yielding action, by which means the packings can yield to any unevenness or inequality in the inner surface of the cylinder in which the piston runs, caused by unequal wear of the center more than the ends of the cylinder.

One advantage in this invention is that in expanding the packing-rings but very small movement is required. A slight turning movement of ring D will straighten the links G G sufficiently to expand the packing. Another advantage is that the expansion of the packing is accomplished without any rubbing friction, the links straightening without rubbing.

This invention is applicable to steam, air, water, or other engines, and also to pumps.

Having thus described my invention, I do not claim, broadly, expanding the packing by means of a turning ring acting upon slides or springs; but

What I claim, and desire to secure by Letters Patent, is—

1. In a piston, the combination, with the followers E E and ring D, of the links G G, resting angularly between said parts and supported by reverse lugs $b\ b$, the whole arranged, as described, so that the turning of the ring will cause expansion of the followers by the straightening of the links, as herein shown and described.

2. In a piston, the combination, with the centrally-turning ring D and the worm-gears I K, of the arm M, attached to the ring, the screw L, passing through the gear K, and a coiled spring, P, resting between the arm and a shoulder on the screw, the screw forming a follower to act upon the spring, and the spring producing elastic pressure to operate the turning ring, as herein shown and described.

In witness whereof I have hereunto signed my name in the presence of two subscribing witnesses.

EDGAR M. BIRDSALL.

Witnesses:
  HOBART M. CHAPMAN,
  WILLIAM T. MORRIS.